United States Patent Office 3,677,855
Patented July 18, 1972

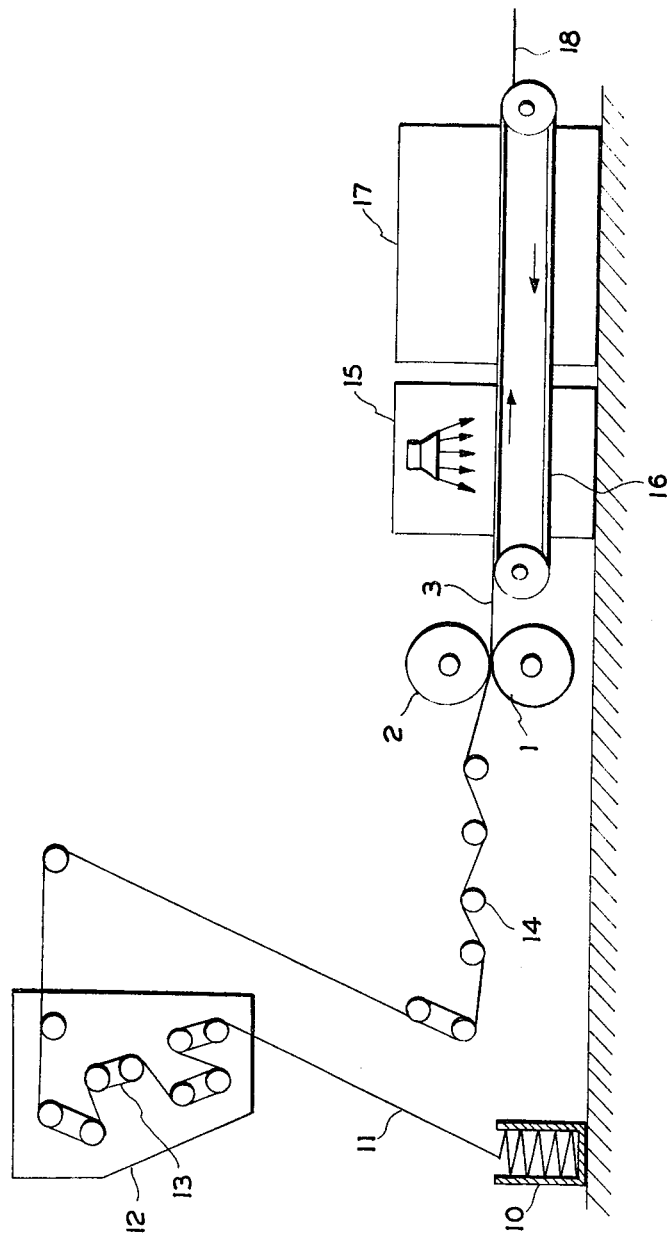

3,677,855
PROCESS AND APPARATUS FOR THE PRODUCTION OF SYNTHETIC TEXTILE STUFFING MATERIAL
Robert Bolliand and Claude Saligny, Lyon, France, assignors to Societe Rhodiaceta, D.A.P.I.D., Paris, France
Filed June 24, 1970, Ser. No. 49,487
Claims priority, application France, June 27, 1969, 6921813
Int. Cl. D04h 3/12
U.S. Cl. 156—181       1 Claim

ABSTRACT OF THE DISCLOSURE

A process and apparatus for producing synthetic textile stuffing material from a cable of continuous synthetic filaments, which may or may not be crimped, for use in stuffing articles such as sleeping bags, anoraks, quilts, etc. This process consists in passing a cable of continuous synthetic filaments between two smooth rollers turning at different peripheral speeds and having an alternate relative transverse movement, receiving the thus flattened cable of continuous synthetic filaments on a conveyor belt, spraying this flattened cable with a binding material, and causing the binding material to harden.

---

This invention relates to a process and apparatus for making stuffing material. More particularly, this invention relates to a process and apparatus for making stuffing material from a cable of continuous synthetic filaments by passing this cable through a pair of rollers which are turning at different peripheral speeds and having a relative transverse movement, receiving this flattened cable on a conveyor belt, spraying this flattened cable with a binding resin, and causing this resin to harden.

The process and apparatus of this invention is an improvement on the process and apparatus disclosed in French Pat. 1,540,268 which issued on Aug. 19, 1968. In this patent, a process is disclosed for producing wavy fibrous stuffing layers from a cable of continuous synthetic filaments. These layers are particularly useful for stuffing pillows. The process of this patent consists in passing a cable of continuous filaments under tension between two smooth rollers driven at different peripheral speeds and receiving the layer formed on a conveyor belt and spraying this formed layer with a binder. This process produces a stuffing material having a wavy layer of continuous synthetic filaments fixed in place by means of a synthetic resin.

Although the stuffing materials which are produced using the process of such French patent are suitable for use in stuffing pillows, these products were not found to be suitable for use as stuffing or padding material for articles such as coverlets, quilts, anoraks, sleeping bags, etc. In order to produce stuffing materials which are useful for these articles using the process of French Pat. 1,540,268, it was found necessary to pass the cable of synthetic fibers through two sets of rollers.

It has been found, however, that by using the process and apparatus of this invention, a stuffing or padding material suitable for use in article requiring a relatively flat stuffing material, such as coverlets, quilts, sleeping bags, anoraks, etc., can be produced by passing the cable of synthetic fibrous material through only one set of rollers. This has the advantage of saving a great amount of time and money since only one set of rollers is needed for each production line and no handling is needed during the process.

When used in the description of the process and apparatus of this invention, the terms, "stuffing material" and "padding material," mean a more or less compressible and slightly elastic textile material having a relatively flat external surface and which is suitable for use in articles such as coverlets, quilts, anoraks, sleeping bags, etc. The term, "cable," means a large number of filaments assembled without twisting or intertwining. The cable may or may not be crimped.

Briefly, the process of this invention comprises an improvement on the process of French Pat. 1,540,268, which process comprises passing a cable of continuous synthetic filaments between two smooth rollers which are turning at different peripheral speeds, receiving the flattened cable of synthetic filaments on a conveyor belt, spraying the flattened cable with a resin, and hardening the resin, the improvement comprising imparting to one of the rollers an alternating transverse movement. The apparatus of this invention comprises two rollers, at least one of which has a relative alternating transverse movement.

It is a principal object of this invention to provide a process for producing relatively flat stuffing materials suitable for use in sleeping bags, coverlets, quilts, anoraks, etc., requiring only a single pass between rollers turning at different peripheral speeds.

It is a further object of this invention to provide an apparatus which is capable of producing stuffing materials having fairly flat external surfaces in a single pass.

It is a still further object of this invention to provide an apparatus comprising two smooth rollers, turning with different peripheral speeds, at least one of these rollers having a transverse movement relative to the other.

Still further objects and advantages of the process and apparatus of this invention will become more apparent by reference to the drawings and the following more detailed description thereof:

FIG. 2 shows a schematic side view of the process of this invention employing the novel rollers as shown in FIG. 1.

Figure 1:
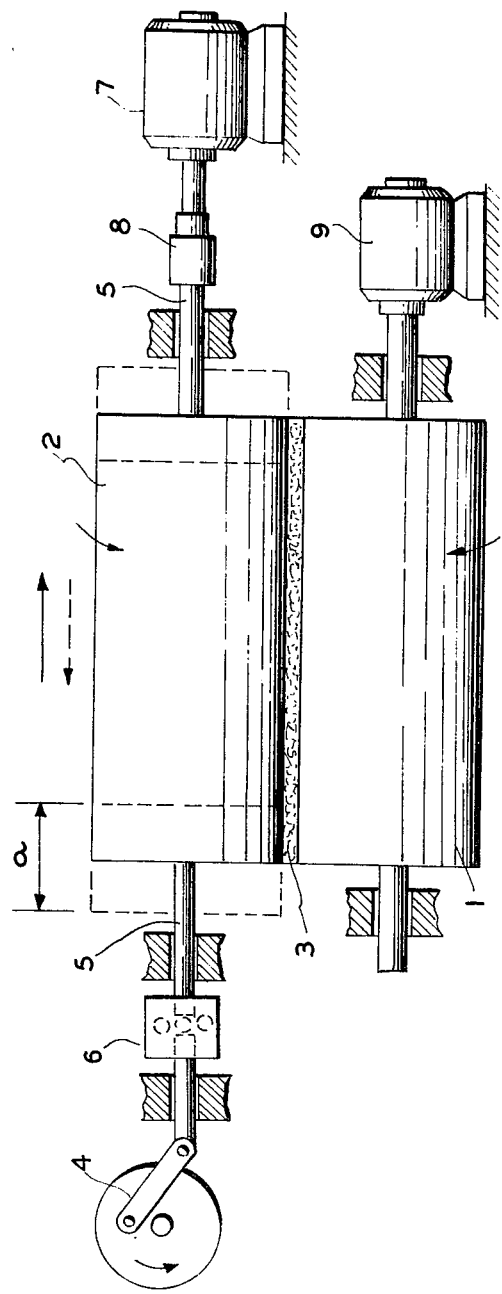
FIG. 1 is a front view of the novel rollers of this invention.

FIG. 1 shows a front view of the novel apparatus of this invention. This apparatus consists basically of a bottom roller 1, a top roller 2, and a transverse movement means 4. Bottom roller 1, which is stationary with respect to transverse motion, is rotationally driven in the direction of the advance of the cable by means of motor 9. Upper roller 2 is rotationally driven in the direction of the advance of the cable by motor 7 which imparts to upper roller 2 a greater peripheral speed than that of lower roller 1. Motor 7 is connected to one end of shaft 5 of upper roller 2 by means of a device 8, such as a sliding joint, which permits the rotational driving of the roller and its transverse movement *a*. Transverse movement *a*, which varies alternately, is caused by a transverse movement means 4, such as rod and crank system, as shown, or a cam system. The transverse movement means 4 is connected to the other end of shaft 5 of upper roller 2 by means of a ball-bearing case 6 which permits the rotation and the alternating transverse movement of upper roller 2.

A further embodiment of the apparatus comprises adding a transverse movement means to lower roller 1. This transverse movement means must be synchronized to transverse movement means 4 so that rollers 1 and 2 have a relative transverse motion.

As stated above, upper roller 2 is driven at a greater peripheral speed than lower roller 1, and for this apparatus to operate effectively the ratio of the peripheral speeds of rollers 2 and 1 must be at least 5 to 1, with the preferred ratio being 7.5 to 1. Also, the alternating transverse motion of upper roller 2 may be in the range of from 0.15 to 1 hertz and the amplitude *a* of this alternating transverse movement is in the range of from 0.2 to 60 mm. The preferred range for the frequency is from between 0.5 and 0.8 hertz and the preferred amplitude range is from 20 to 40 mm.

The external surfaces of rollers 1 and 2 have either a straight or curved generatrices and may be joined along a common generatrix. The smooth surfaces of rollers 1 and 2 can be any material with a high friction factor, a rubber with a Shore hardness of 60° being preferred. Also, the gap between upper roller 2 and lower roller 1 is preferably adjustable so these rollers may be capable of processing cables containing varying amounts of filaments.

Referring to FIG. 2, which shows a schematic diagram of the process of this invention employing the apparatus of this invention, a continuous cable of synthetic filaments 11 is drawn from a conventional packing box 10 over jamming devices 12 and stretchers 13 and through tensioning devices 14. These jamming, spreading and tensioning devices open up the cable 11 into a somewhat flat surface before it is fed between upper roller 2 and lower roller 1. Cable 11 should be fed directly between rollers 1 and 2 so that cable 11 is perpendicular to the axes of rotation of rollers 1 and 2. The tension imparted by means of the tensioning devices varies depending upon the strength of the cable, for example, with a cable of 220,000 dtex (200,000 deniers) a tension from between 0.5 and 5 kilograms is suitable. The spread out and tensioned cable is passed between lower roller 1 and upper roller 2 to form flat layer 3, which is received without any tension by the endless conveyor belt 16 and passes this layer into resin-spraying chamber 15 and then into heating oven 17 which hardens the resin which has just been deposited on layer 3. The proportion of resin in the layer 3 should be kept low since in practice proportions of resin higher than 10% by weight increase the price needlessly and lead to articles which are often too hard. After passing through heating oven 17, the now coated layer passes onto table 18 for further processing and packaging.

In the process of this invention, the synthetic cable may be made from any filament forming artificial or synthetic material such as linear super polyamides, e.g., nylon 6, nylon 66, nylon 610, nylon 11, polyolefins, e.g., polypropylene, various vinyl polymers and derivatives, linear polyesters, e.g., polyethylene terephthalate and copolyesters, acrylonitrile polymers, etc.

The resin which is sprayed on the layer after passing through the rollers is any resin which is capable of being heat-hardened, such as acrylic resins.

The following non-limiting example further illustrates the process of this invention.

EXAMPLE

The cable of 220,00 dtex (200,000 deniers) composed of filaments of polyethylene terephthalate with a unit count of 5 dtex (4.5 deniers) and a crimping of 8 to 9 waves per centimeters is formed into a layer 200 millimeters wide by means of spreading tensioning and jamming devices. This layer passes between two smooth, rubber-coated rollers under a tension of 1.5 kilograms. These rollers have a diameter of 205 millimeters and a Shore hardness of 60° with a gap between them of 0.15 millimeter. The peripheral speed of the upper roller is 15 meters per minute and the lower roller's speed is 1.90 meters per minute. Also, the upper roller has an alternating transverse motion with an amplitude of 35 millimeters and a frequency of 0.66 hertz. After the layer passes between the rollers, it is received without tension on a conveyor belt driven at a speed of 4.5 meters per minute. This layer then passes into a spray chamber wherein an acrylic resin is deposited on both faces of the layer and then into an oven which hardens the acrylic resin. The resulting layer has fairly flat external surfaces and weighs about 170 g./m.$^2$ and a width of 420 millimeters and a thickness of 20 millimeters.

The product of this process is easily compressible, resilient, and does not agglomerate. This product is an excellent stuffing and padding material for sleeping bags, anoraks, quilts and coverlets.

While a preferred embodiment of the present invention has been illustrated by way of specific example, it is to be understood that the present invention is in no way to be deemed as limited thereto, but should be construed as broadly as all or any equivalents thereof.

The exemplary embodiments of the invention having been described, the true nature and scope of what is desired to be insured by letters patent is defined in the appended claim.

What we claim is:

1. A process for making a stuffing material which consists of passing a cable of continuous synthetic filaments between two smooth rollers, said rollers having a high friction factor and turning at different peripheral speeds in the direction of the advance of the cable, the axis of rotation of said two rollers being parallel and the gap between said two rollers being adjustable, the direction of advance of the cable being perpendicular to the axis of rotation of the rollers, receiving the layer of filaments from between the rollers without tension on a conveyor belt, spraying the layer of filaments with a binding material, heating the sprayed layer of filaments to harden the binding material wherein the improvement comprises moving one of said rollers in relation to the other roller in a reciprocating transverse movement wherein the amplitude of said tranverse movement is from 0.2 to 60 millimeters and the frequency of the reciprocating transverse movement is from 0.15 to 1 hertz.

References Cited

UNITED STATES PATENTS

| | | | |
|---|---|---|---|
| 3,017,309 | 1/1962 | Crawford et al. | 156—161 |
| 3,032,829 | 5/1962 | Mahoney et al. | 19—65 T |
| 3,156,016 | 11/1964 | Dunlap et al. | 19—65 T |
| 3,497,920 | 3/1970 | Brownell | 19—65 T |
| 3,523,059 | 8/1970 | Coates | 156—181 |
| 3,558,393 | 1/1971 | Bolliand et al. | 156—180 |

FOREIGN PATENTS

| | | | |
|---|---|---|---|
| 1,540,268 | 11/1966 | France | 156—181 |

CARL D. QUARFORTH, Primary Examiner

R. S. GAITHER, Assistant Examiner

U.S. Cl. X.R.

19—65 T; 156—161, 180, 496